United States Patent [19]

Henkel

[11] Patent Number: 5,085,397
[45] Date of Patent: Feb. 4, 1992

[54] STACKABLE SUPPORT APPARATUS

[76] Inventor: Daniel L. Henkel, 9595 W. 70th Ave., Arvada, Colo. 80004

[21] Appl. No.: 571,396

[22] Filed: Aug. 22, 1990

[51] Int. Cl.⁵ .................................. F16M 11/00
[52] U.S. Cl. ................... 248/688; 248/165; 211/194; 182/178
[58] Field of Search ............. 248/688, 165, 188.8, 248/682, 677, 676, 150; 211/194, 188; 182/178, 151, 225, 181-186; 108/156, 91, 135

[56] References Cited

U.S. PATENT DOCUMENTS

| | | | |
|---|---|---|---|
| 1,996,761 | 4/1935 | Gould et al. | 182/129 |
| 3,175,642 | 3/1965 | Neeley . | |
| 3,334,942 | 8/1967 | Breslow | 108/91 X |
| 3,480,111 | 11/1969 | Larson . | |
| 3,756,581 | 9/1973 | Albertini | 211/194 X |
| 3,848,700 | 11/1974 | Davis, Jr. | 182/178 X |
| 4,433,753 | 2/1984 | Watson | 182/151 |
| 4,903,796 | 2/1990 | Magyar et al. . | |

FOREIGN PATENT DOCUMENTS

| | | | |
|---|---|---|---|
| 536894 | 12/1955 | Italy | 211/188 |
| 633255 | 2/1962 | Italy | 108/91 |
| 109814 | 2/1944 | Sweden | 248/676 |
| 718326 | 11/1954 | United Kingdom | 108/91 |

*Primary Examiner*—Karen J. Chotkowski
*Attorney, Agent, or Firm*—Henderson & Sturm

[57] ABSTRACT

A support apparatus (10) for finishing and stacking a plurality of workpieces (200) at vertically spaced intervals. The support apparatus (10) comprises a plurality of identical support members (12) capable of nesting on top of one another and adapted to be operatively and rotatably engaged relative to the opposed edges of individual workpieces (200).

5 Claims, 2 Drawing Sheets

STACKABLE SUPPORT APPARATUS

TECHNICAL FIELD

The present invention relates to the field of support structures in general, and in particular to a rotatable and stackable support apparatus that will permit building materials to be finished on all sides and then stacked in a spaced parallel fashion.

BACKGROUND ART

This invention was the subject matter of Document Disclosure Program Registration No. 249,735 which was filed in the United States Patent and Trademark Office on March 30, 1990.

As can be seen by reference to the following U.S. Pat. Nos. 1,996,761; 3,480,111; 3,175,642; and 4,903,796; the prior art is replete with myriad and diverse structural support members employed for a variety of reasons.

While all of the aforementioned prior art constructions are more than adequate for the basic purpose and function for which they have been specifically designed, these patented constructions are neither designed nor intended to fulfill the role of the present. In addition, none of the patented constructions contemplate the need for a relatively rotatable support device that will allow both sides of a workpiece to be finished and which will also permit the finished workpiece to be disposed in a vertically spaced stack that will permit the drying of any wet finished surface.

In the building trades in particular, one of the most time consuming tasks is the finishing of large flat sheets of building material. One side of a sheet at a time is finished and then when the finished side is dry, the other side of the sheet is finished. The main reason that this process takes so long is due to the fact that nothing is supposed to rest on the wet finish until it is dry. As a consequence, the sheets cannot come into direct contact with one another during the drying process.

As a consequence of the foregoing situation, there has existed a longstanding need for a support apparatus that will not only suspend the individual sheets at vertically spaced intervals, but which also will allow the individual sheets to be rotated relative to the support apparatus so that both sides of the sheet can be finished in an expedited sequential fashion, and the provision of such a construction is a stated objective of the present invention.

DISCLOSURE OF THE INVENTION

Briefly stated, the support apparatus that forms the basis of the present invention comprises a plurality of support leg members having an apertured head element dimensioned to receive a conventional fastener such as a nail or the like. The conventional fastener is designed to form a rotatable operative connection between the support leg members and a sheet of building material.

As will be explained in greater detail further on in the specification, not only does the rotatable connection between the support leg members and the workpiece facilitate the finishing of both sides of the workpiece, but due to the stackable cooperation between the support leg members, the workpiece can be stacked at vertically spaced intervals which will substantially reduce the storage space that is required during the drying period.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1:
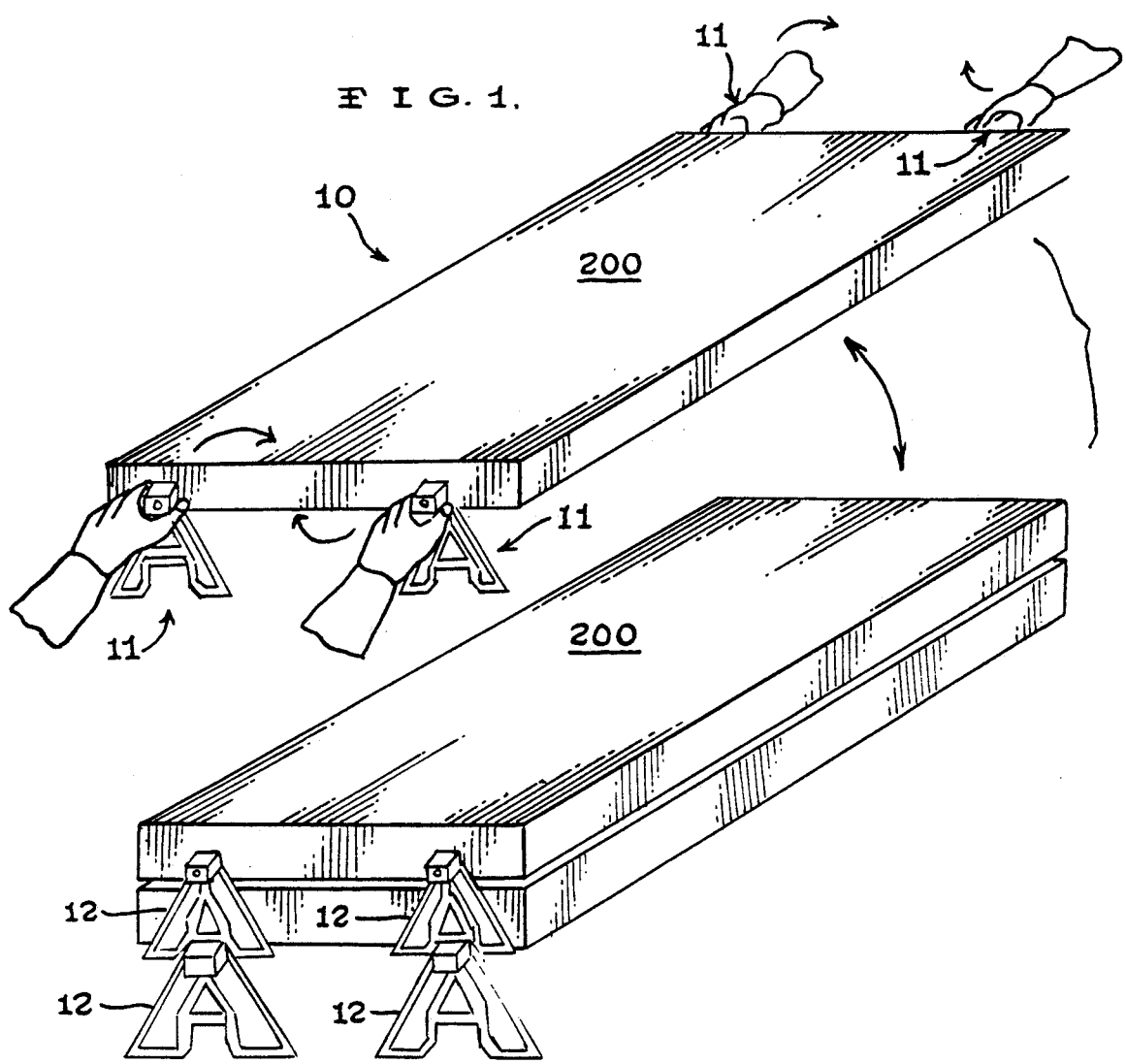
FIG. 1 is an enlarged perspective view of the apparatus.

As can be seen by reference to the drawings, and in particular to FIG. 1, the support apparatus that forms the basis of the present invention is designated generally by the reference numeral (10). The apparatus (10) of this invention comprises a plurality of identical support units (11) and as a consequence for the purposes of this specification, only one of the support units (11) will be described in specific structural detail.

Figure 2:
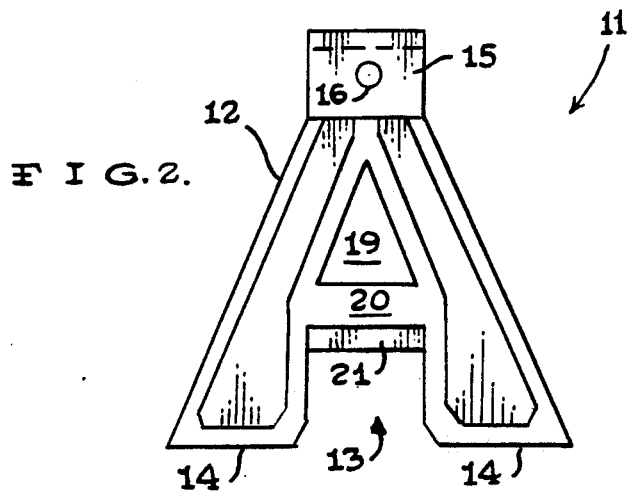
FIG. 2 is an isolated front plan view of one of the support units.
Figure 3:
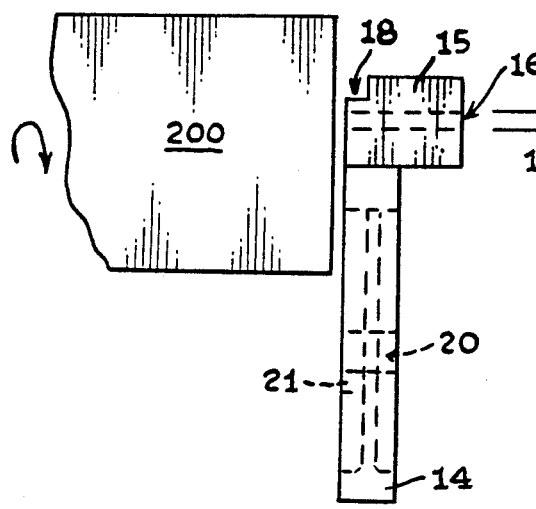
FIG. 3 is a side plan view of the operative engagement of a support unit with a workpiece.

As can best be seen by reference to FIGS. 2 and 3, each support unit (11) comprises a generally triangular shaped relatively thick support member (12) having a contoured stepped recess (13) formed in the base of the support member (12). The recess (13) divides the base into a pair of widely spaced support legs (14).

In addition, the top of the support member (12) is provided with an enlarged and elongated generally rectangular head element (15) having a horizontally disposed central aperture (16) and a shallow transverse recess (18) formed across the top of the back of the support member (12), whose purpose and function will be described in greater detail further on in the specification.

As can also be seen by reference to FIGS. 2 and 3, the support member (12) is further provided with a generally triangular aperture (19) disposed above, and spaced from the central recess (13) by a cross-piece element (20) which serves as a stiffening member between the support legs (14).

Figure 5:
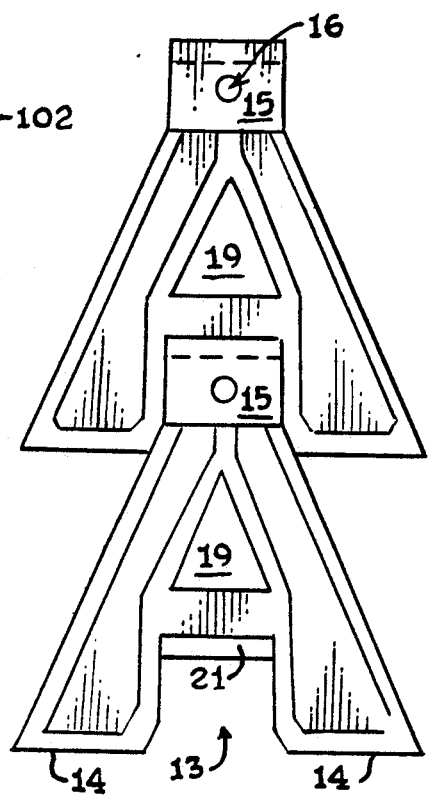
FIG. 5 is a front plan view of the operative engagement between support units.
Figure 4:
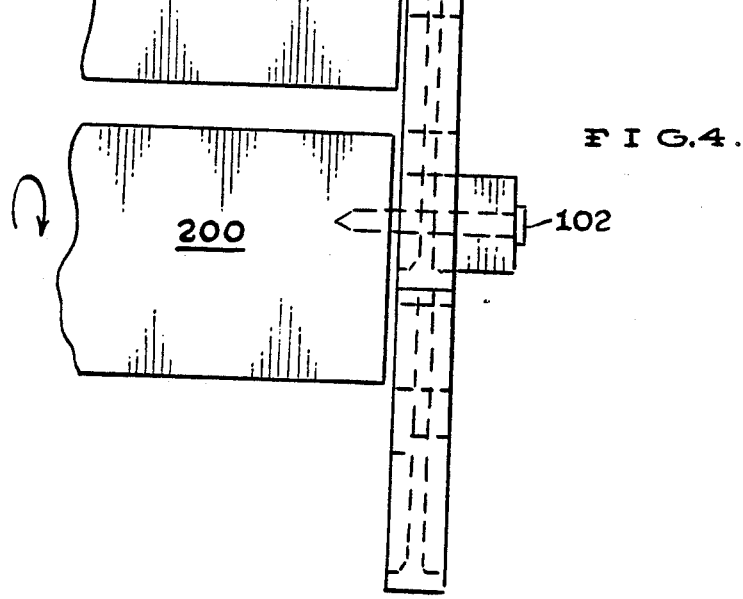
FIG. 4 is a side plan view of the operative engagement between a pair of support units and their associated workpieces.

In addition, the stepped recess (13) has a generally rectangular stepped upper end which forms a downwardly depending stepped shoulder (21) on the back of the cross-piece element (20). The stepped shoulder (21) on the cross-piece element (20) is the reciprocal of and vertically aligned with, the shallow transverse recess (18) formed across the top of the back of the support member (12). Furthermore, the lower end of the central recess (13) is flared outwardly such that the central recess (13) in the lower portion of the support member (12) is the reciprocal of the top portion of the support member (12) to permit a plurality of support members (12) to be stacked upon one another in a nesting fashion as depicted in FIGS. 4 and 5.

It should also be appreciated at this juncture that the operative engagement between the transverse recess (18) on the lower support member (12) and the stepped shoulder (21) on the upper support member (12') limits the lateral displacement of the support members (12, 12') in their operative stacked mode of disposition.

As can be seen particularly by reference to FIG. 3, the rear surface of the support members (12) are generally flat, whereas, the enlarged and elongated head element (15) projects outwardly from the face o the support member (12) to form a handle. In addition, the central apertures (16) in the head element (15) is dimensioned to accept the shank (101) of a conventional fastener (100) having an enlarged head (102) such as a nail.

In operation, the apparatus (10) of this invention is intended to be deployed in conjunction with one or more flat elongated sheets (200) of building material, hereinafter referred to as workpieces. The workpieces have planar surfaces that must be finished, such as by painting or the like.

In order to effect the finishing process and to allow any wet finished surface to dry before coming into contact with other surfaces, all that is required is to operatively engage a plurality of support units (11) at spaced locations on the opposed edges of a given workpiece.

This operative engagement is accomplished by drawing vertical lines at spaced and aligned locations on the opposed edges of the workpiece. Then the apertures (16) on the head elements (15) of the support members (12) are positioned proximate the midpoints of the vertical lines, and the fastener (100) is used to operatively engage the support members (12) on the opposed edges of the workpiece.

At this juncture, the top surface may be finished and while the finish is still wet, workmen can grasp the support units on the opposed edges to invert the workpiece (200) such that the bottom surface is now the top surface as depicted by the arrows in FIG. 1.

Furthermore, when one workpiece has been finished and is in the process of drying, a second workpiece can be equipped with another group support members (12) and the process can be repeated. However, due to the vertical nesting capability of the support members (12), the second group of support members (12) can be engaged on top of the first group of support members (12) such that each successive workpiece can be stacked at vertically spaced intervals relative to the next lowest workpiece as depicted in the bottom portion of FIG. 1. In this manner, a plurality of workpieces can be stacked one upon the other while still leaving adequate airflow space between the workpieces to promote the drying of the finishes and while preventing the wet finished surfaces from coming into contact with one another.

Having thereby described the subject matter of the present invention, it should be apparent that many substitutions, modifications and variations of the present invention are possible in light of the above teachings. It is therefore to be understood that the invention as taught and described herein is only to be limited to the extent of the breadth and scope of the appended claims.

I claim;

1. A support apparatus for supporting and suspending a plurality of workpieces at vertically spaced intervals relative to one another; wherein, the support apparatus comprises:

a plurality of identical generally A-shaped support units, wherein each support unit comprises a support member having an enlarged head element provided with a pair of downwardly depending support legs which are connected together by a cross-piece element to form a central recess; wherein, the bottom of the cross piece element is provided with a transverse stepped shoulder; extending substantially across the length of said cross-piece element and, wherein the enlarged head element is dimensioned to be received in the central recess in said cross-piece element and further provided with a transverse stepped recess which is the reciprocal of the stepped shoulder on said cross-piece element.

2. The support apparatus as in claim 1, wherein said enlarged head element is provided with a discrete elongated aperture dimensioned to receive a conventional elongated fastener.

3. The support apparatus as in claim 2, wherein, said enlarged head element projects outwardly on one side from said support legs to form a handle.

4. A support apparatus for supporting and suspending a plurality of workpieces at vertically spaced intervals relative to one another; wherein, the support apparatus comprises:

a plurality of identical support units, wherein each support unit comprises a generally A shaped support member including a pair of support legs separated by a central recess and joined together both by a cross-piece element and an enlarged head element; wherein, said enlarged head element extends outwardly from said support legs to form a handle; and, wherein said enlarged head element is dimensioned to be received in said central recess and is further provided with an elongated discrete aperture that is dimensioned to receive an elongated conventional fastener.

5. The support apparatus as in claim 4, wherein said cross-piece element is provided with a stepped shoulder and said enlarged head element is provided with a transverse recess which is the reciprocal of said stepped shoulder.

* * * * *